Figure 1:
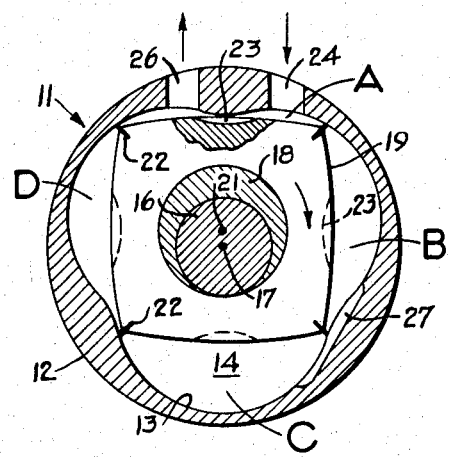

INVENTORS
DANKWART EIERMANN
FELIX WANKEL

INVENTORS
DANKWART EIERMANN
FELIX WANKEL
BY
Raymond P. Wallace
AGENT

United States Patent Office 3,359,954
Patented Dec. 26, 1967

3,359,954
ROTARY INTERNAL COMBUSTION ENGINE AND METHOD OF OPERATION THEREOF
Dankwart Eiermann and Felix Wankel, Lindau (Bodensee), Germany, assignors to NSU Motorenwerke Aktiengesellschaft, Neckarsulm, and Wankel G.m.b.H., Lindau (Bodensee), Germany
Filed Apr. 5, 1966, Ser. No. 540,311
9 Claims. (Cl. 123—8)

This invention relates to internal combustion engines of the trochoidal type, and more particularly to such engines in which the pressure for diesel operation can be attained, or in which the power output of an Otto-cycle engine can be increased.

It is already known that rotary engines having a two-lobed epitrochoidal outer body and a three-apexed inner body can be built not only for Otto-cycle operation, but as diesel engines. However, to use such engines as diesels it is necessary, in order to reach the pressures required for self-ignition, to markedly diminish the axial eccentricity as compared to that of the Otto engine. Since this renders the working chambers smaller, compensation must be made by making the engine large axially and, especially, radially. This enlargement results in compression chambers of elongated and flat configuration, which is detrimental to spontaneous ignition in the cold engine, and to complete combustion.

The present invention makes possible either a diesel engine of approximately the same axial offset and overall dimensions as a two-lobed Otto engine of equal throughput, or an Otto engine having a higher throughput than one of similar overall size but greater axial eccentricity.

Rotary engines having a three-lobed epitrochoidal outer body and a four-apexed rotor are known. One such device is described in U.S. Patent No. 2,988,065, in which a transfer passage is provided between two lobes of a three-lobe housing, whereby combustion gases may be transferred from a high pressure expansion stage in one working chamber to a lower pressure expansion stage in the preceding chamber, before reaching the exhaust port.

Another device of a similar general configuration is disclosed in U.S. Patent No. 3,097,632. In the latter patent there is provided a pre-compression stroke which is utilized to atomize fuel injected into the preceding chamber. This procedure is not suitable for diesel operation, since the fuel cannot be injected into a chamber at high compression for firing, but instead is injected into a chamber which is at approximately its maximum volume and must subsequently go through a compression phase. Further, the engine of Patent 3,097,632 requires two intake ports which renders it inconvenient and uneconomical to construct, and it has a high internal work loss which lowers its efficiency.

It is an object of the present invention to provide a rotary engine of the epitrochoidal type in which the intake volume of substantially two working chambers is compressed into a single working chamber.

Another object is to provide a rotary engine of the type described in which two working chambers intake simultaneously through a single intake port.

A further object is to provide a rotary engine having a three-lobed epitrochoidal housing providing a communicating passage between two lobes in the intake portion.

Still another object of the invention is to provide an engine of the type described capable of diesel operation.

Another object is the provision of a method of operation of a rotary engine of epitrochidal type.

The foregoing objects and others ancillary thereto will be readily understood on reading the following specification in connection with the accompanying drawings, in which FIGS. 1–8 show the engine of the invention and its complete operating cycle.

In FIG. 1 there is shown a cross-section transverse to the axis of a trochoidal type rotary internal combustion engine 11, having an outer body comprising a three-lobed peripheral housing 12 with a basically epitrochoidal inner surface 13 and a pair of end walls of which only the rearmost end wall 14 is shown. A shaft 16 transpierces the end walls along the longitudinal axis 17 of the outer body, and has an eccentric portion 18 disposed within the outer body on which is rotatably mounted an inner body or rotor 19, rotatable about the axis 21 of the eccentric portion. Axis 21 is displaced from and parallel to the outer body axis 17. Rotor 19 is of generally square profile when viewed in the axial direction, having four apex portions each bearing a longitudinally disposed apex seal 22 sweeping the inner epitrochoidal surface 13 in sealing relation therewith, thereby forming four working chambers of variable volume between the inner and outer bodies. Each of the four slightly arcuate working faces between apexes of the rotor is provided with a cut-out or recess 23 for transfer of gases across the cusps of the epitrochoid. As shown, the rotor turns in a clockwise direction, and peripheral housing 12 is provided with an intake port 24 communicating with the first lobe for drawing in a fuel-air mixture for Otto cycle operation, or air for diesel operation. The housing is also provided with an exhaust port 26 communicating with the third lobe for exhaust of combustion products. Although the intake and exhaust ports of the outer body are shown for convenience as being located in the peripheral wall, it will be understood that they may otherwise be provided in either or both end walls. Items not necessary to an understanding of the invention, such as bearings, end face seals, oil seals, cooling arrangements, gearing between the rotor and the housing, etc., are not shown.

As shown in FIG. 1 the rotor is in top dead center position, forming between its working faces and the inner surface of the peripheral housing four working chambers A, B, C, and D. The first housing lobe, into which the intake port 24 opens, is always an intake lobe. The second lobe in the clockwise direction is at times an intake lobe and at times a compression lobe, and the third lobe is an expansion and exhaust lobe. A bypass channel 27 is provided in the peripheral wall across the cusp of the epitrochoid between lobes one and two, providing communication between the two lobes during certain portions of the operating cycle.

A complete operating cycle of the engine is shown sequentially in FIGS. 1 to 8. In FIG. 1 chamber A has completed exhausting and is about to begin intake, there being a slight communication briefly between the intake and exhaust ports through the rotor recess 23. The cycle will be described by following the progress of chamber A.

Figure 2:
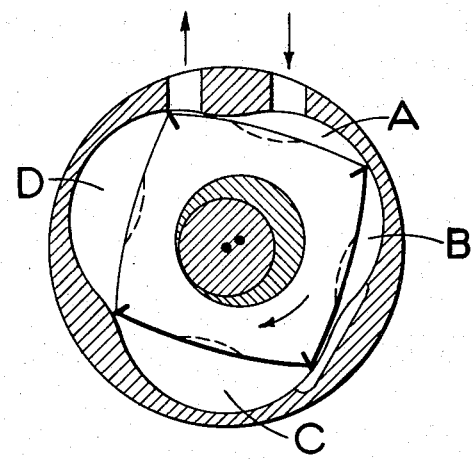
Figure 3:
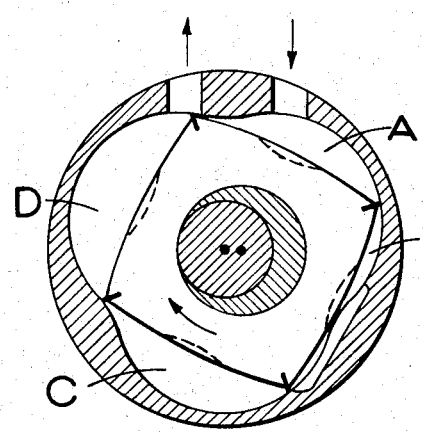
Figure 4:
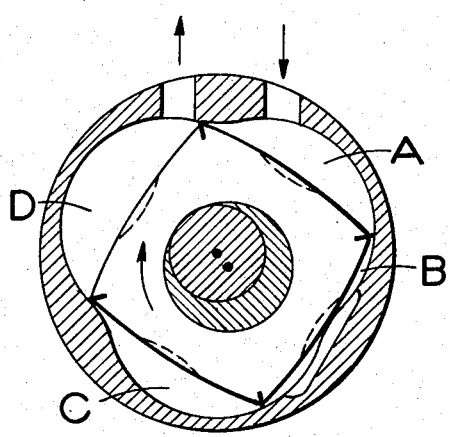
Figure 5:
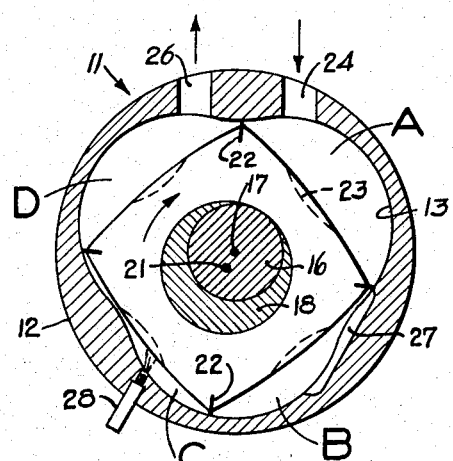

In FIG. 2 chamber A has begun to intake through port 24, and the trailing apex of the rotor is about to close exhaust port 26. In FIG. 3 chamber A is still intaking and the exhaust port is nearly closed. In FIG. 4 chamber A is still intaking and the exhaust port is fully closed. In FIG. 5 chamber A has nearly reached its maximum volume, and the leading rotor apex is about to pass the edge of bypass channel 27 to open communication between chambers A and B.

Figure 6:
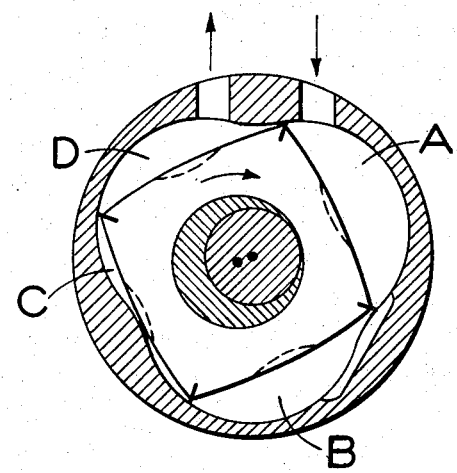
Figure 7:
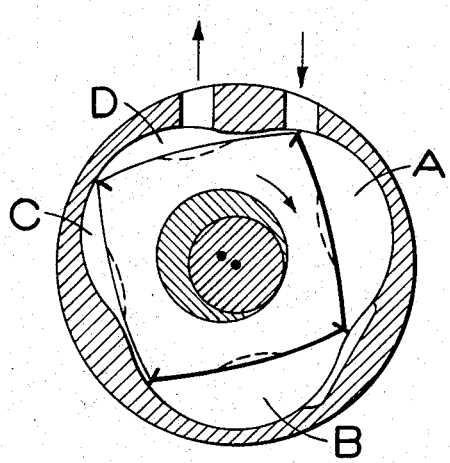
Figure 8:
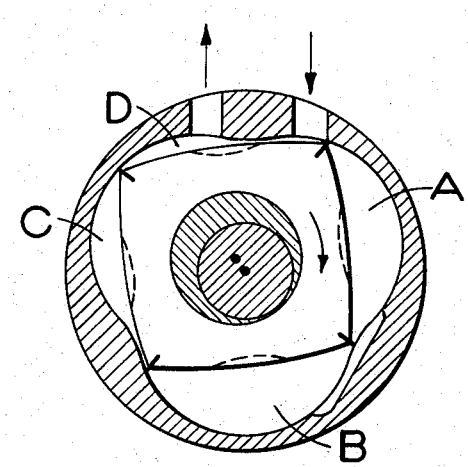

In FIG. 6 there is full communication between chambers A and B, with a transfer of intake air or fuel-air mixture from A into B. Chamber A has reached its maximum volume but is still open to the intake port, and chamber B is expanding and in communication with A, so that intake continues uninterrupted. In FIG. 7 chambers A and B have reached approximately their combined maximum volume, and are still in communication with each other through bypass 27 and with the intake port. In FIG. 8, the intake port has closed, and chamber A has begun to contract, thus beginning to transfer its contents to chamber B through the bypass.

The description of the cycle is continued by returning to FIG. 1, chamber A being now in the position there shown as chamber B, by which designation it will now be followed. Chamber B is contracting and transferring its contents through the bypass to chamber C. This procedure is continued in FIG. 2, wherein the combined volume of chambers B and C is contracting and the contents of B are being squeezed over to C.

In FIG. 3 chamber B has reached approximately its minimum volume, the principal portion of its contents has been transferred to C, and communication through bypass 27 has just been closed by the leading rotor apex of chamber B. The description will be continued with reference to chamber C, which is contracting and compressing in FIG. 3, and continues such contraction and compression in FIG. 4. In FIG. 5 chamber C has almost reached dead center with respect to the cusp of the epitrochoid, and sufficient pressure has been attained for self-ignition in diesel operation, or at which spark ignition may be initiated in an Otto cycle.

When operating by diesel cycle, fuel injection through nozzle 28 will occur into chamber C at the position shown in FIG. 5 and spontaneous ignition takes place by reason of the high compression therein. If operating by Otto cycle, a spark plug positioned at approximately the location of nozzle 28 is activated and combustion begins. In FIG. 6 chamber C begins its expansion phase, by transfer of combustion products across the cusp of the epitrochoid through rotor cut-out 23. Expansion of chamber C continues in FIGS. 7 and 8. Chamber C next occupies the position of chamber D as shown in FIG. 1, and continues its expansion phase in FIG. 2 where it is at approximately maximum volume and the leading apex of the rotor is about to open the exhaust port. In FIG. 3 the exhaust port is open and chamber D is exhausting, which it continues through the remainder of the figures until it reaches dead center in FIG. 1 and becomes chamber A.

As will be seen from the drawings, in FIG. 2 the combined chambers B and C communicating through the bypass 27 will be at the same pressure, which is increasing as rotation continues. This pressure continues to increase in the combined chambers until rotation closes the communication, as shown in FIG. 3, and B and C again become separate chambers. In FIGS. 3 and 4 chamber C continues compression, and a certain small amount of residual pressure remains in chamber B which is at its smallest volume. By the time the position of FIG. 5 has been reached whereupon chamber C is ignited, chamber B has re-expanded so that its residual pressure has dropped to approximately that of the following chamber A with which communication is just about to be established through bypass 27. Therefore, when the bypass is opened between chambers B and A as shown in FIG. 6, there is no blowback from B to A, and the two chambers are a common expanding volume which continues intaking.

The invention provides the advantage that the necessary pressure for diesel operation may be attained without increasing the overall dimensions of the engine, or that a greater throughput for Otto cycle operation may be obtained. Further, no additional porting is required, and currently available injection and ignition systems may be used. Additionally, the drive shaft, eccentric, and coupling gearing of rotor and housing can be made substantially stronger in the 3:4 machine of the invention than in the corresponding 2:3 type.

Although the invention has been described in a preferred embodiment, it will be understood that it is not limited to the device shown and described, and that various changes and modifications may be made by those skilled in the art without departing from the scope of the invention. It is intended to cover all such modifications in the appended claims.

What is claimed is:

1. A rotary internal combustion engine, comprising in combination an outer body having a peripheral wall with a basically epitrochoidal inner surface of first, second, and third lobes and a pair of parallel end walls spaced apart by said peripheral wall along the longitudinal axis thereof; a drive shaft transpiercing said end walls and having an eccentric portion disposed within said outer body, said eccentric portion having an axis displaced from and parallel to said outer body axis and planetating therearound; a four-apexed inner body disposed within said outer body and mounted on said eccentric portion for rotation about said eccentric axis with said apexes sweeping said inner surface in sealing relation thereto; said outer body having an intake port communicating with said first lobe and an exhaust port communicating with said third lobe; and said peripheral wall having passage means intercommunicating between said first and second lobes during at least some rotational positions of said inner body.

2. A rotary internal combustion engine as recited in claim 1, wherein said intercommunicating passage means is generally circumferentially disposed across the cusp of the epitrochoid between said first and second lobes and has one end in said first lobe and the other end in said second lobe.

3. A rotary internal combustion engine as recited in claim 2, wherein said intercommunicating passage has a shorter circumferential extent than the distance between two adjacent rotor apexes, and wherein during rotational positions of said rotor when a working face of said rotor defined by a pair of adjacent apexes spans said intercommunicating passage with one of said adjacent apexes outside each end thereof said first and second lobes are not in communication and when any of said rotor apexes is traversing the length of said passage said first and second lobes are in communication through said passage.

4. A rotary internal combustion engine as recited in claim 3, wherein fuel injection means is positioned in the region of the cusp between said second and third lobes.

5. A rotary internal combustion engine as recited in claim 3, wherein ignition means is positioned in the region of the cusp between said second and third lobes.

6. A method of operation for rotary internal combustion engines of the type having an epitrochoidal housing of first, second, and third lobes and having a four-apexed rotor therein forming variable volume chambers with said housing, comprising expanding a first chamber in said first lobe and intaking a fluid thereinto, then opening a communication between said first and second lobes into a second chamber, expanding said first and second chambers simultaneously and continuing fluid intake thereinto, then contracting said first chamber while maintaining said communication and transferring fluid therethrough to said second chamber, then closing said communication and compressing fluid in said second chamber, then igniting said compressed fluid to expand said second chamber to produce rotation of said rotor, then exhausting said second chamber.

7. A method as recited in claim 6, wherein said first chamber after communication is closed with said second chamber is re-expanded and communication is opened with a following chamber.

8. A method as recited in claim 7, wherein said fluid is air and fuel is injected into said second chamber just before ignition.

9. A method as recited in claim 7, wherein said fluid is a fuel-air mixture and said ignition is produced by an electrical spark.

References Cited

UNITED STATES PATENTS

| 2,988,065 | 6/1961 | Wankel | 123—8 |
| 3,097,632 | 7/1963 | Froede | 123—8 |

RALPH D. BLAKESLEE, *Primary Examiner.*